United States Patent
Cocchi et al.

(10) Patent No.: US 6,907,743 B2
(45) Date of Patent: Jun. 21, 2005

(54) METHOD FOR CONTROLLING AND OPTIMIZING THE CYCLE FOR PRODUCTION OF ICE CREAM DEPENDING ON THE MIXTURES USED

(75) Inventors: Gino Cocchi, Bologna (IT); Gianni Zaniboni, Borgonuovo Di Sasso Marconi (IT)

(73) Assignee: Ali S.p.A. - Carpigiani Group (IT)

( * ) Notice: Subject to any disclaimer, the term of this patent is extended or adjusted under 35 U.S.C. 154(b) by 0 days.

(21) Appl. No.: 10/685,393

(22) Filed: Oct. 16, 2003

(65) Prior Publication Data

US 2004/0083754 A1 May 6, 2004

(30) Foreign Application Priority Data

Oct. 30, 2002 (IT) .................................. GE2002A0101

(51) Int. Cl.[7] .................................................. A23G 9/12
(52) U.S. Cl. .............................. 62/68; 62/208; 62/277; 62/342
(58) Field of Search .......................... 62/136, 208–213, 62/277–278, 342–343

(56) References Cited

U.S. PATENT DOCUMENTS

| | | | | |
|---|---|---|---|---|
| 2,265,552 A | * | 12/1941 | Sticelber | ..................... 62/63 |
| 4,476,146 A | * | 10/1984 | Manfroni | ..................... 426/522 |
| 4,747,272 A | * | 5/1988 | Howell et al. | ................. 62/136 |
| 5,809,789 A | * | 9/1998 | Baker et al. | .................... 62/81 |
| 6,694,752 B2 | * | 2/2004 | Nomura et al. | ................ 62/136 |

* cited by examiner

*Primary Examiner*—William E. Tapolcai
(74) *Attorney, Agent, or Firm*—Stites & Harbison, PLLC; Marvin Petry

(57) ABSTRACT

Method for controlling and optimising the cycle for production of ice cream depending on the mixtures used in the ice-cream making machine, comprising a freezing cylinder exchanging heat with the evaporator of a refrigerating circuit, and a stirrer/scraper element rotating inside said freezing cylinder and actuated by a suitable electric motor, and further comprising a processing element, sensors for detecting continuously the temperature values of the refrigerating gas at the inlet and at the outlet of the evaporator and means for detecting continuously the value of the electric power used by the motor, said temperature values and said values for the electric power used by the motor being continuously input into said processing element; a software program in said processor for processing said values being able to provide an output signal which drives an impulse solenoid valve which introduces continuously the hot gases removed from the exhaust of the compressor into the main stream of refrigerating fluid.

6 Claims, 12 Drawing Sheets

METHOD FOR CONTROLLING AND OPTIMIZING THE CYCLE FOR PRODUCTION OF ICE CREAM DEPENDING ON THE MIXTURES USED

BACKGROUND AND SUMMARY OF THE INVENTION

The present invention relates to a method for controlling and optimising the cycle for production of ice cream depending on the mixtures used.

At present the production cycle of an ice-cream making machine is controlled depending on the hardness achieved by the ice-cream mixture, said hardness being detected by mechanical means or by recording the power consumption of the stirrer motor.

However, this method of control does not take into due consideration factors such as the composition of the ice-cream mixture (mixture based on fruit or milk or fat) or the quantity of mixture present in the mixing chamber, or also the quantity of liquid mixture fed into the mixing chamber following extraction of a considerable quantity of ice cream, etc.

The main subject of the present invention, therefore, is a method which allows the preparation, within a predetermined freezing time, of an end product (ice cream) with repetitive characteristics as regards its consistency and its temperature, the quantity of emulsified air (overrun) and its creaminess, irrespective of the quantity and the type of product being processed in the freezing cylinder of the machine.

This result is obtained by suitably managing the operation of the compressor, regarded as a cold-generating source, of the stirrer/scraper regarded as a means for distributing cold throughout the mass of the product, and of the valve for injecting hot gas into the evaporator, regarded as a means for controlling the temperature of the refrigerating fluid in the said evaporator.

The management of these components is aimed at maximising the coefficient of transfer between the refrigerating fluid and the product, preventing the evaporation temperature between inlet and outlet of the evaporator from falling below a predetermined value, causing the formation of ice on the surface of the freezing cylinder (product side) and a consequent reduction in the flow of heat from the product to the refrigerating fluid, with an undesirable increase in the freezing time.

The management of these components is performed automatically by the machine designed so as to be capable of recognising both the quantity of product present in the evaporator chamber and the quality thereof, namely whether it consists of a watery fruit-based mixture or creamy milk-based mixture.

The quantity of product is determined by the machine on the basis of the progression of the integral or sum of the temperature differences of the refrigerating fluid between the evaporator inlet and outlet. This reading is performed at regular time intervals, for example every 4".

$$\text{INTEGRAL} = \sum_{-}^{0} \Delta(T_U - T_E)$$

The quality of the product is recognised by the machine on the basis of the number ($N_q$—product quality number) obtained by multiplying the abovementioned integral, revised at each subsequent reading, by that which is defined here as the "consistency derivative" of the product recalculated at each reading, the term "consistency derivative of the product" being understood as being the ratio between the increase in consistency $\Delta c$ in a time interval $\Delta \tau$ which is very short and the time itself:

$$\text{Consistency derivative} = \frac{\Delta c}{\Delta \tau}$$

There exists, in fact, for each machine a value $N_m$ which can be determined in an experimental manner such that, if the number obtained as described above is greater than it, the product inside the chamber is of the creamy type, whereas if it is lower than it, the product inside the chamber is of the watery or fruit-based type.

The product of the watery type is most sensitive to low evaporation temperatures of the refrigerating fluid since, in these conditions, it forms more easily than the creamy product layers of ice on the inner wall of the freezing cylinder, assuming a characteristic appearance, with loss of "creaminess", which is referred by experts in the sector as "frozen" owing to the presence of large ice crystals in its mass. In these conditions, since the layer of ice on the cylinder wall acts as a heat insulant delaying the exchange of heat between evaporator and product, the product being processed takes a relatively long time to reach the optimum consistency required and, on many occasions, does not even reach it.

In order to overcome this problem, it is envisaged according to the present method injecting into the stream of the refrigerating fluid, at the inlet of the evaporator, a suitable quantity of hot gas taken from the delivery of the compressor. It is pointed out that these injections of hot gas per unit of time must not be too numerous to avoid reducing excessively the life of the valve and must each be sufficiently short not to modify substantially the temperature condition of the refrigerant in the evaporator.

Since the evaporator reacts to a temperature change at its inlet with a delay of about 60 seconds, the hot gas injections must cover a much shorter period, equal to about 20 seconds, and have a duration of 0.5 to 2 seconds.

The hot gas is therefore supplied continuously at the start of the freezing time so as to establish an "operational zero" of the evaporator distinguished by a predetermined value of the temperatures of the refrigerant at the inlet and at the outlet of the evaporator in the presence of "zero consistency" and as soon as the inlet temperature drops below +10° C. and the outlet temperature drops below +21° C.

When the operational zero is reached, the supplying of hot gas continues for the whole of the freezing period for the durations indicated above.

BRIEF DESCRIPTION OF THE FIGURES

The present invention will now be described in detail with reference to the accompanying drawings in which.

DESCRIPTION OF THE PREFERRED EMBODIMENTS OF THE INVENTION

Figure 1:
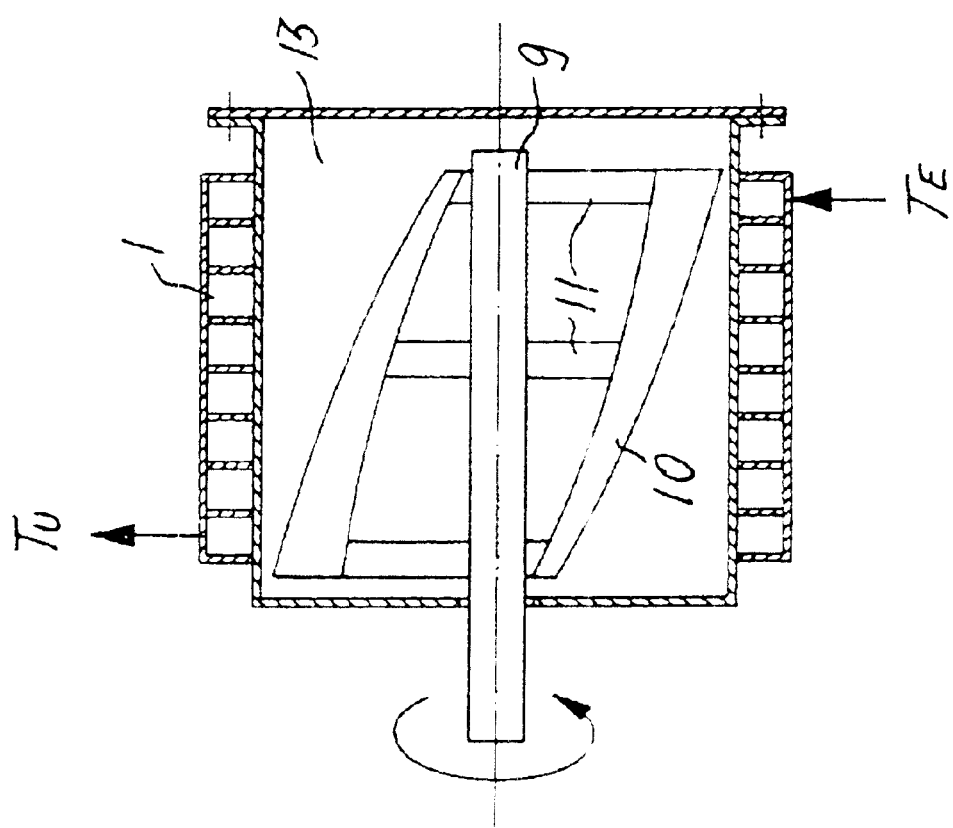
FIG. 1 shows schematically a longitudinal section through a freezing chamber of an ice-cream making machine.

With reference to the drawings, FIG. 1 shows in schematic form a conventional freezing chamber 13, the cylindrical jacket of which is surrounded by the evaporator 1 of the refrigerating unit (not shown) and equipped inside with a stirrer/scraper 10 mounted on the shaft 9 by means of the spokes 11. $T_E$ denotes the temperature of the refrigerating gas at the inlet into the evaporator 1 and $T_U$ denotes the temperature of this gas at the outlet from the evaporator 1.

Figure 2:
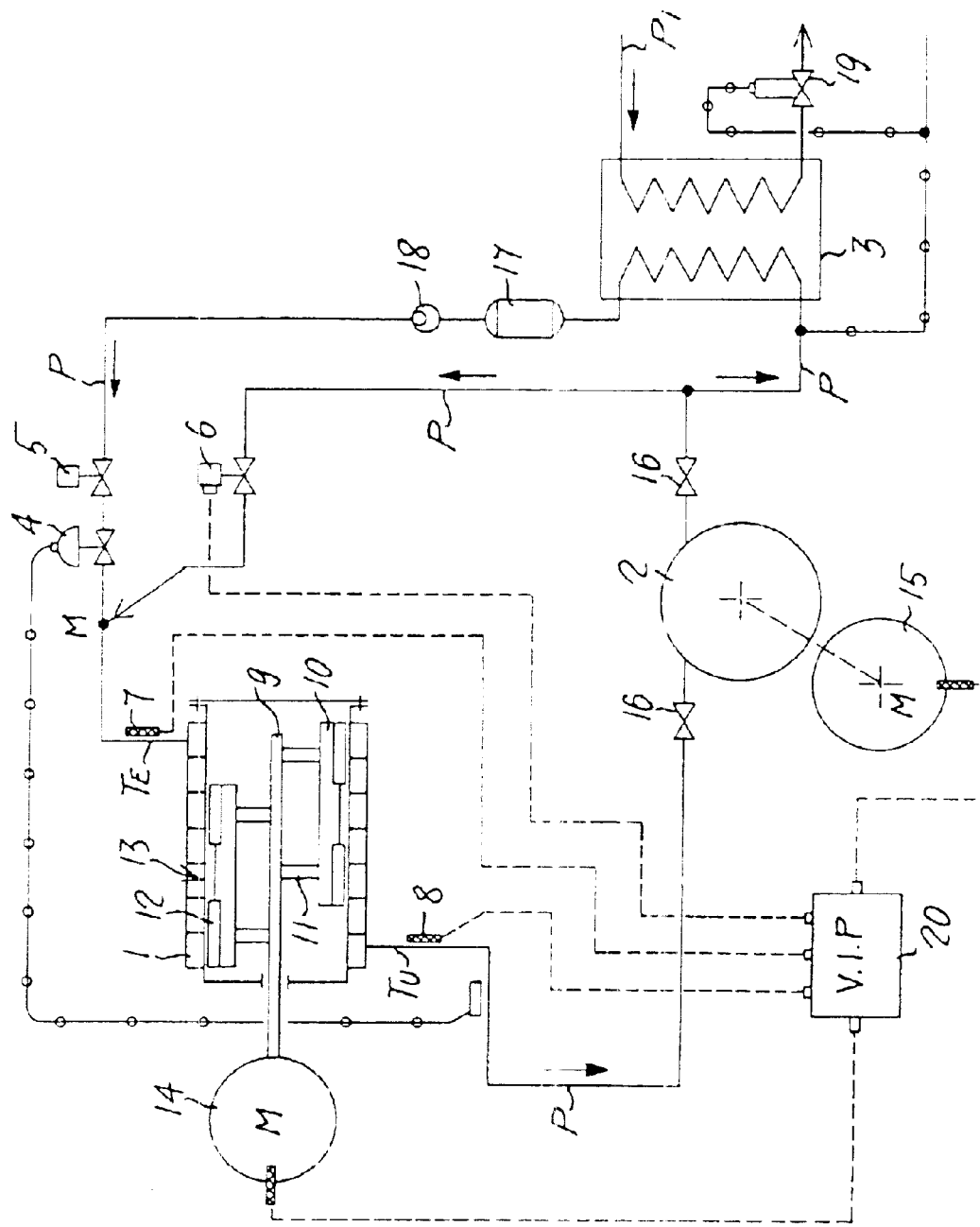
FIG. 2 shows the circuit diagram of an ice-cream making machine according to the present invention.

With reference now to FIG. 2 of the drawings, an example of a refrigerating circuit for implementing the method according to the invention will be described. This circuit comprises, as shown, a series of pipes P which connect together some circuit components, namely the evaporator 1, the motor-driven compressor 2, the condenser 3 and the thermostatic expansion valve 4.

The pipes P of the refrigerating circuit also have, arranged along them, secondary members for controlling the flow of the refrigerating fluid, namely the solenoid valve 5 for supplying the liquid refrigerant into the evaporator 1, the solenoid valve 6 for introducing hot gas taken from the compressor exhaust into the main stream of refrigerating fluid at the point M downstream of the thermostatic valve 4.

Two sensors 7 and 8 detect the temperatures $T_E$ at the inlet and $T_U$ at the outlet of the evaporator. A rotating member consisting of the shaft 9 and the vanes 10 for stirring the product, suitably connected to the shaft 9 by means of the spokes 11 and supporting the scraper plates 12, spreads and removes continuously the product from the inside surface 13 of the evaporator 1.

Rotation of the stirrer/scraper member is performed by the motor 14. The motor-driven compressor 2 is actuated by the motor 15. Accessory members of the refrigerating circuit are the shut-off taps 16 upstream and downstream of the compressor, the dehydration filter 17 and the lamp indicating the flow of refrigerant 18.

P1 denotes also the set of pipes for supplying and discharging the cooling water to/from the condenser 3 of the refrigerating fluid.

An economiser valve 19 is mounted on the piping for the water discharged from the condenser 3, said valve having the function of regulating the flowrate of the water in order to keep the delivery pressure of the compressor 2 constant.

20 denotes a device which is referred to as an "Acquisition/processing/actuating unit/V.I.P" which receives continuously, the temperature values of the refrigerating fluid $T_E$ at the inlet and $T_U$ at the outlet of the evaporator, together with the value of the electric power used by the motor 14. This unit 20, using a suitable mathematical algorithm (integrated software), processes the data received, modifying the components controlled, if necessary, so as to ensure optimum freezing of the product independently of the time taken which will be, indirectly, dependent upon the particular type of mixture (rheological properties or apparent viscosity during the freezing process) and the quantity of air which that type of mixture can incorporate (overrun) and which influences, together with the temperature of the refrigerant in the evaporator, the final consistency of the product.

The Functions of the Regulator "V.I.P. 20"

The main functions of the control unit with integrated software, which forms the regulator 20, can be summarised as follows:

1) Injection of a modulated flow of hot gas for the entire duration of the product freezing stage. The flow of hot gas injected by the solenoid valve 6 passes through the evaporator 1 together with the normal flow of refrigerant supplied by the thermostatic valve 4, avoiding an excessively rapid drop in the evaporation temperature with the consequent formation of layers of ice on the inner surface of the evaporator, favouring the maximum constant transfer of heat from the product to the refrigerant fluid. In this situation the consistency of the product increases rapidly and constantly until the temperature $T_E$ of the refrigerant at the evaporator inlet remains lower than the corresponding temperature $T_U$ at the outlet thereof. When, however, the difference between the two temperatures is zero, as always occurs towards the end of the freezing stage, the regulator 20 intervenes in a specific manner in each of the three possible situations, as follows:

1.1) The consistency of the product continues to increase in a constant manner: the compressor remains running and the supply of hot gas continues until the signal "ice cream ready" is received.

1.2) The consistency of the product ceases to increase and remains constant: the quantity of heat transferred from the product to the refrigerant is zero. In this case a fairly thick layer of ice forms on the surface of the evaporator, cancelling out the thermal flow of the said evaporator. The compressor is stopped and consequently supplying of hot gas ceases. The stirrer continues operating, scraping away the formed ice which is removed and, being mixed with the product, causes again an increase in its consistency owing to the cooling effect produced within the moving mass by its low temperature. If, in this situation, the signal "ice cream ready" is received, the regulator 20 also stops the stirrer. If, on the other hand, this signal is not received, the regulator starts the compressor again, with the stirrer running, until the signal is received.

1.3) The consistency of the product starts to diminish rapidly. A uniform layer of ice forms on the surface of the evaporator at a temperature which is even lower than that which can encountered in the situation described in section 1.2. In this case also, the regulator stops the compressor and keeps the stirrer running, said stirrer, in time intervals generally greater than those which can be encountered in section 1.2, firstly breaching and then removing the ice, the low temperature of which causes an increase in the consistency of the mass. If, after a predetermined time, the signal "ice cream ready" is received, the regulator merely keeps the stirrer running until the operator has extracted all the ice cream. If, however, after the predetermined time interval, the signal "ice cream ready" is not received, the regulator starts up the compressor again until the signal is received, nevertheless keeping the stirrer running until the ice cream has been extracted completely.

Figure 3:
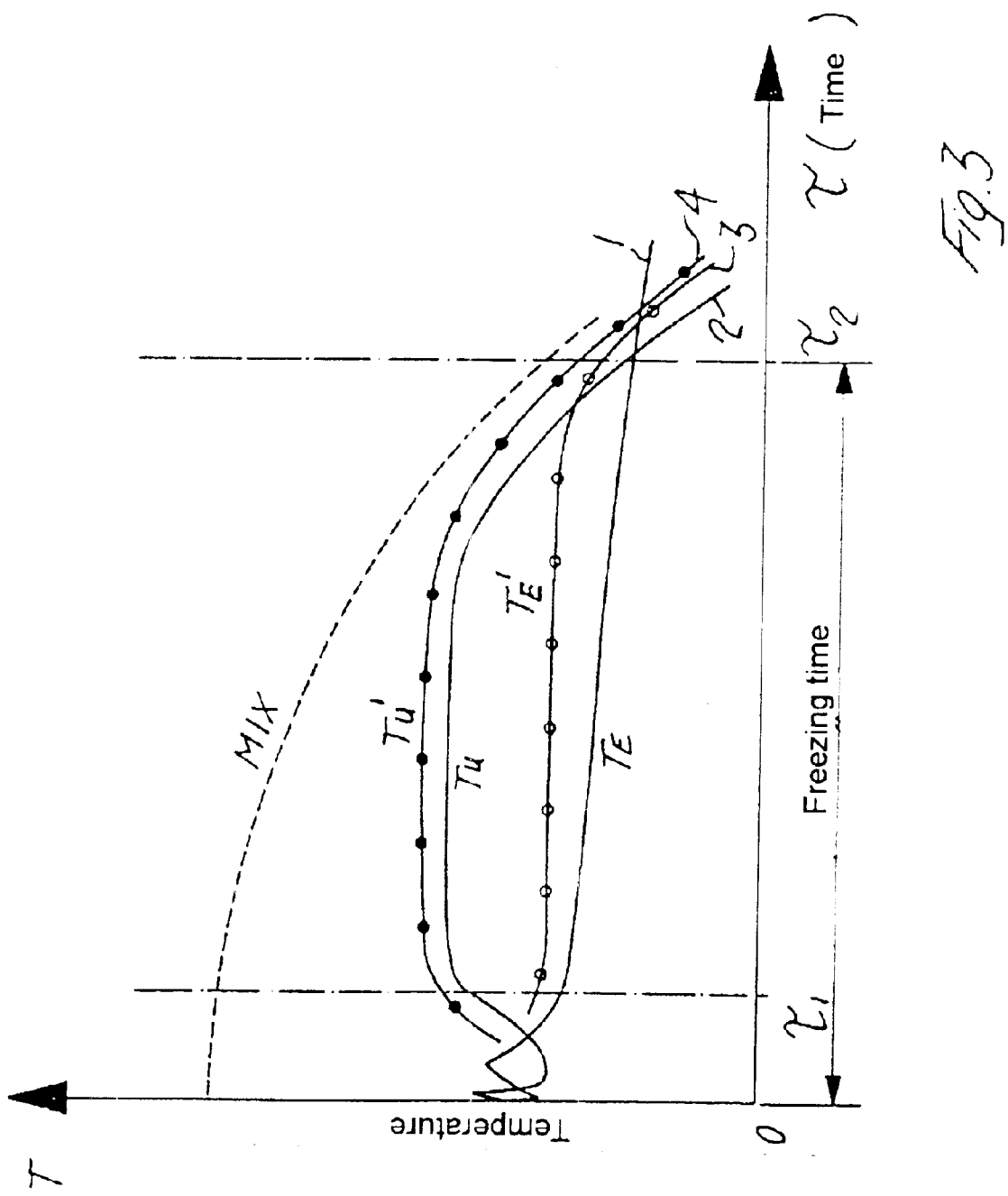
FIG. 3 shows a temperature versus time diagram for freezing a mixture according to the present invention.

With reference now to FIG. 3, it can be observed that, during the time period from 0 to $\tau_1$, or start-up period, the hot gas is supplied continuously, helping the expansion valve 4 to overcome the initial period during which the curves $T_E$ and $T_U$ fluctuate until they are inverted with respect to each other.

At the time $\tau_1$ (operational zero), if injection of hot gas ceases, the refrigerant inlet and outlet temperatures are situated on the continuous curves $T_E$ and $T_U$ and are inverted at the end of the freezing time $\tau_2$, decreasing visibly and causing the formation of ice.

If, on the other hand, after the time $\tau_1$, the supply of hot gas continues in an intermittent manner depending on the continuously updated number (depending on the difference in temperature of the refrigerant at the inlet and outlet of the evaporator and the consistency derivative C of the product), a new progression of the temperatures is obtained, said temperatures passing from those of the continuous curves $T_E$ and $T_U$ to those of the higher curves $T'_E$ and $T'_U$, thus resulting in a reduction in the ice formation and with no longer the intersection at $\tau_2$ and the consequent reduction in the flowrate of the refrigerant.

Figure 4:
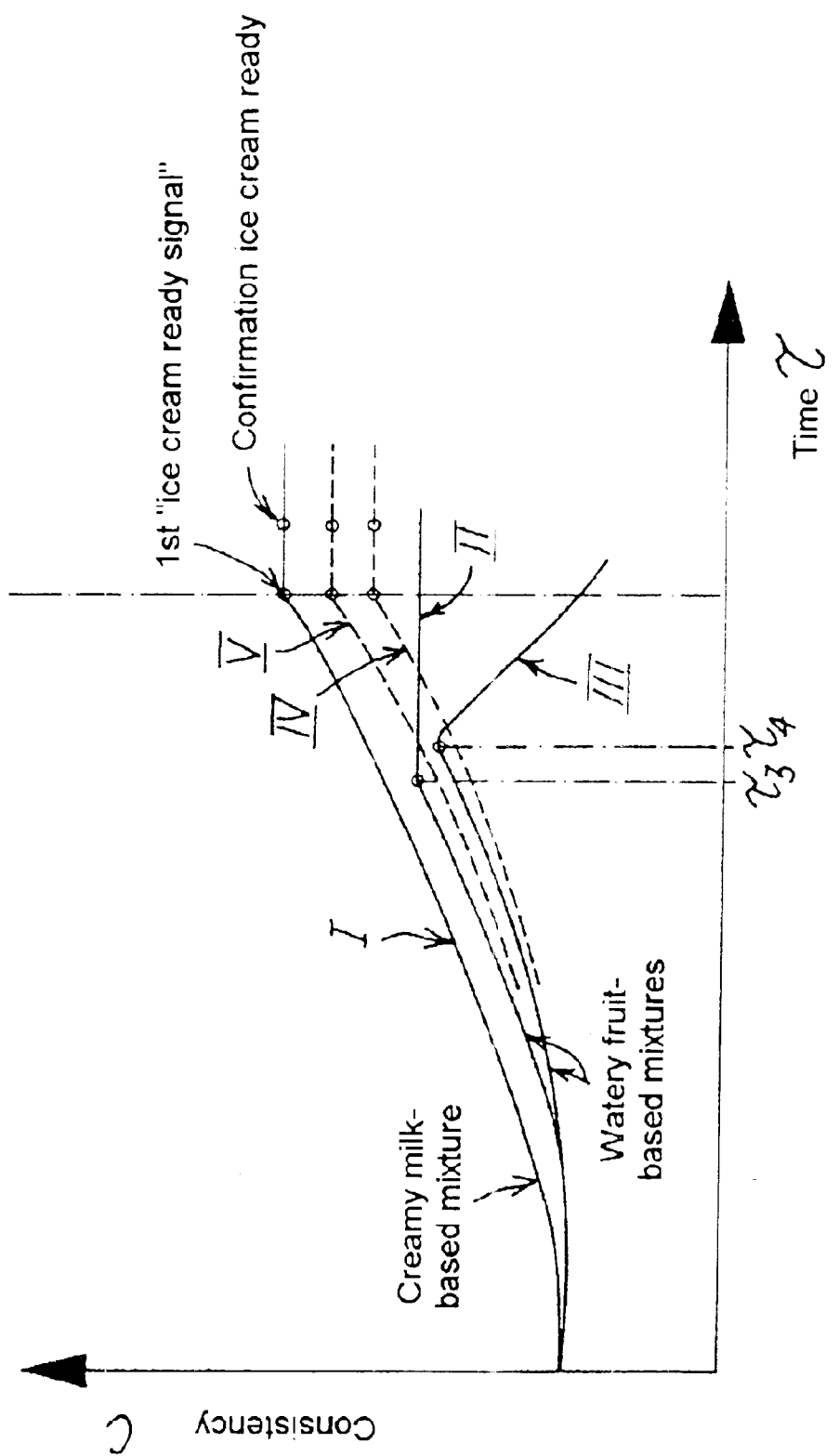
FIG. 4 shows a similar diagram, but for consistency versus time.

With reference now to FIG. 4, the curve $I^a$ refers to a mixture, the freezing of which is assisted by the intermittent supply of hot gas for the whole of the freezing period.

The compressor 2 (FIG. 2) remains constantly in operation. The hot gas is constantly available. The mixture freezes until the signal "ice cream ready" is received, while the product has uniformly released the maximum possible amount of heat to the refrigerant (curved always directed upwards). The consistency increases constantly.

Curves $II^a$ and $III^a$ refer to freezing of watery (fruit-based) mixtures not assisted by the supply of hot gas.

As can be seen, at the times $\tau_3$ and $\tau_4$, the consistency of the product ceases to increase (time $\tau_3$, curve $II^a$) or even drops suddenly (time $\tau_4$, curve $III^a$), owing to the formation of ice on the evaporator, and as a result the compressor is stopped since it is no longer required to continue cooling (other ice would form), whereas only the stirrer remains running and slowly breaks up the cooled-down ice which has formed, dispersing it into the mass of the product and causing indirectly the consistency C to increase again.

If, on the other hand, hot gas is supplied, similar to that carried out for the curve $I^a$, the curves $IV^a$ and $V^a$ are obtained, with complete elimination of ice formation and transmission of heat from the product to the refrigerant in a uniform and increasing manner (curves directed upwards).

Below with the aid of experimental graphs, some operating characteristics of an ice-cream making machine operating in accordance with the present method will be illustrated.

Figure 5:
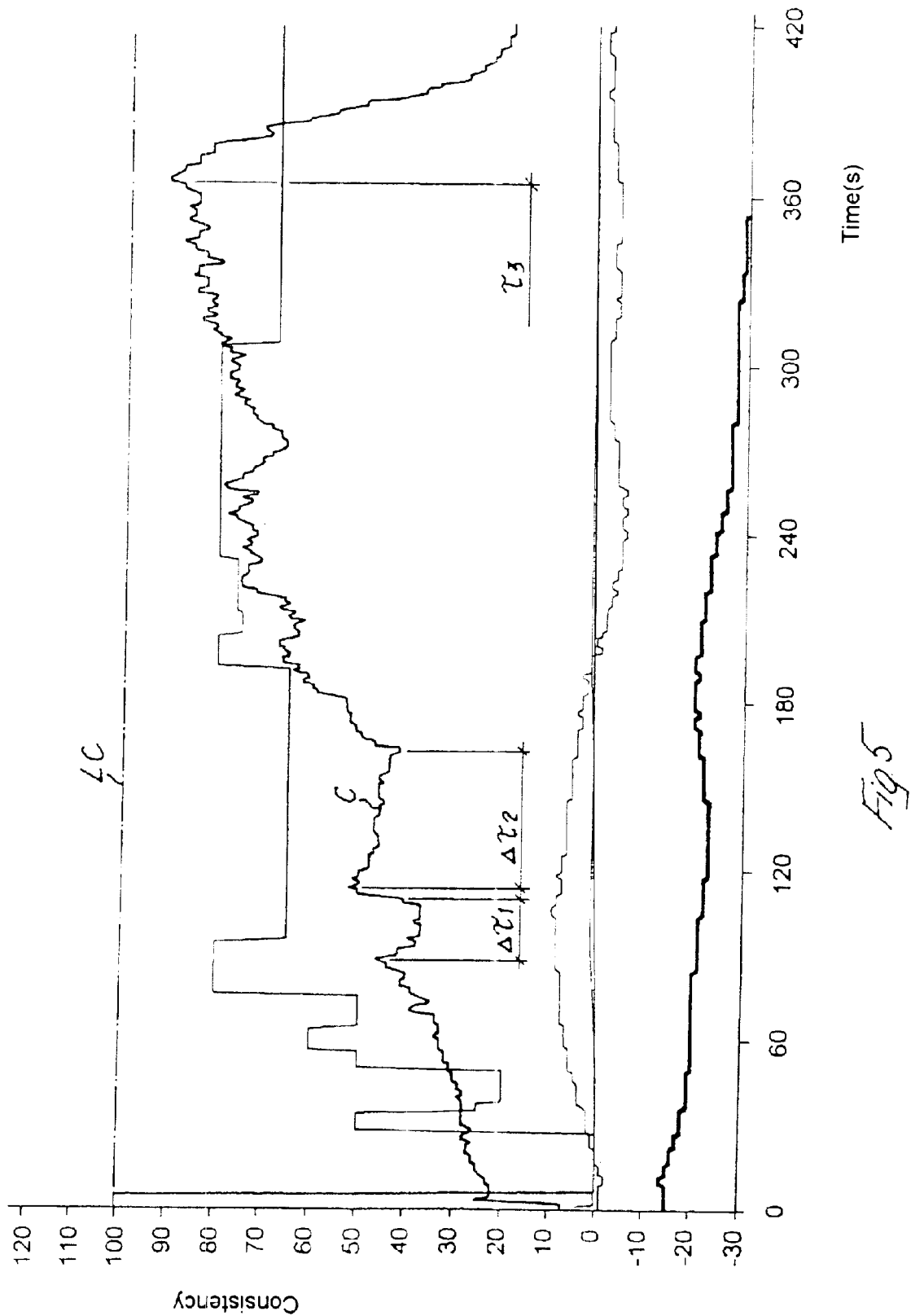
FIG. 5 shows an experimental consistency versus time diagram for a machine operating in accordance with conventional systems.
Figure 6:
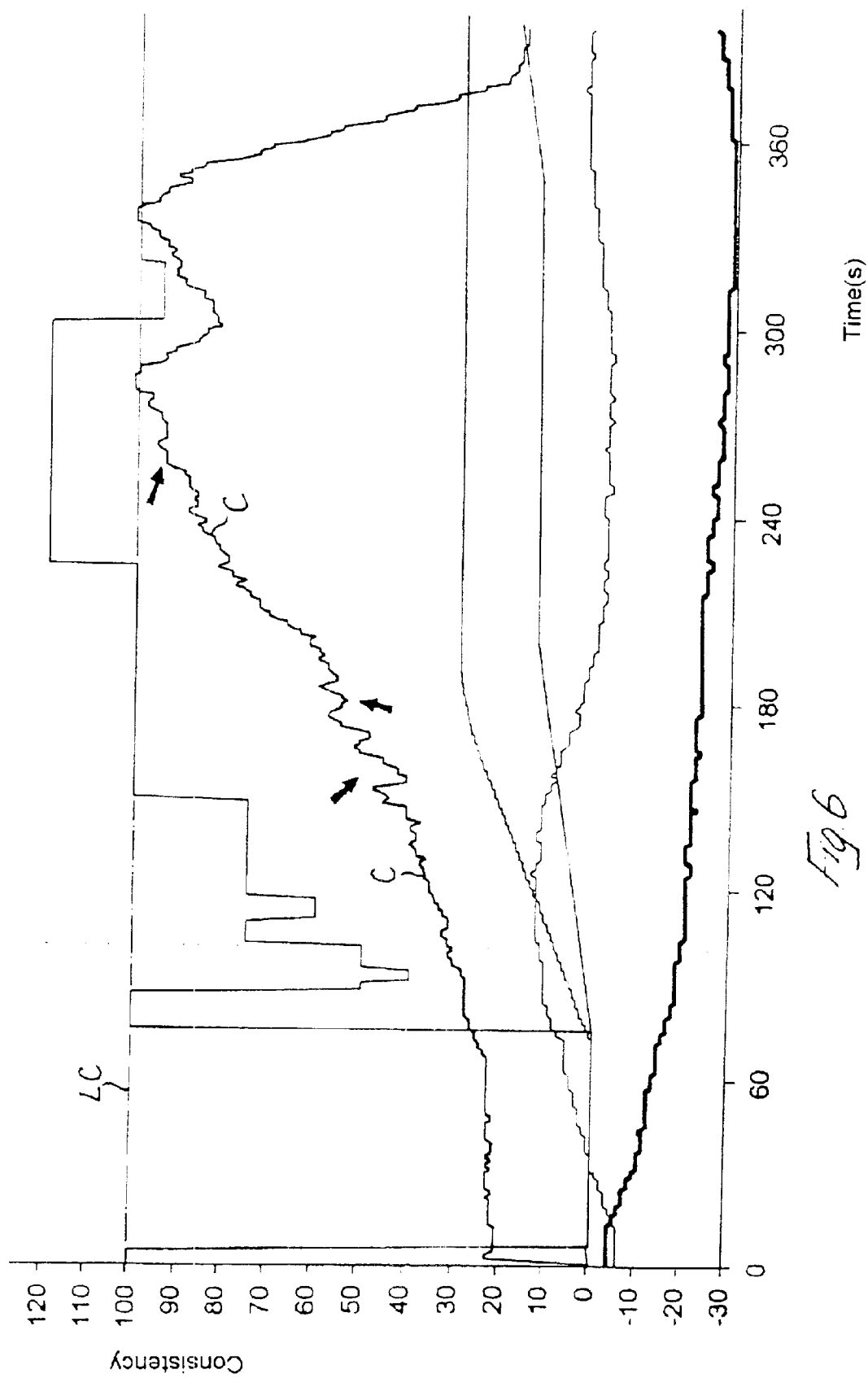
FIG. 6 shows a similar diagram obtained with operation of the machine using the method according to the present invention.

With reference to the diagrams in FIGS. 5 and 6, a continuous broken line marked "consistency" indicates the different progression of the consistency parameter during tests carried out with the mixing chamber charged with 3.0 kg of product, equivalent to about 30% of the maximum charge which can be processed in the machine.

FIG. 5 relates to a mixture processed without the aid of hot gas. It is possible to note the sections $\Delta\tau_1$ and $\Delta\tau_2$, in which the consistency even diminished (formation of ice), which obliged the operator to stop the compressor (interruption in the supply of cold units which can no longer be released to the product), while the stirrer/scraper removes and melts the ice, allowing the compressor to be started again, thereby supplying again cold units to the product, the consistency of which starts to increase again.

FIG. 6 shows instead how, with the aid of the hot gas, the consistency parameter increases uniformly until it reaches the predefined value (100) of "ice cream ready" in a time interval of less than 5 minutes, despite a limited degree of disturbance due to the small quantity of the product treated (see arrows in diagram).

It should be noted that, during the cycle without hot gas (FIG. 5), the influence of the disturbances caused by the formation of ice on the surface of the evaporator had caused a very considerable increase in the product freezing time (compared to that obtained using hot gas—FIG. 6), said product, after a time $\tau_3$=6 minutes (interruption of the test), not even having reached the "ice cream ready" consistency, but barely a value of (90), i.e. 10% less.

Figure 7:
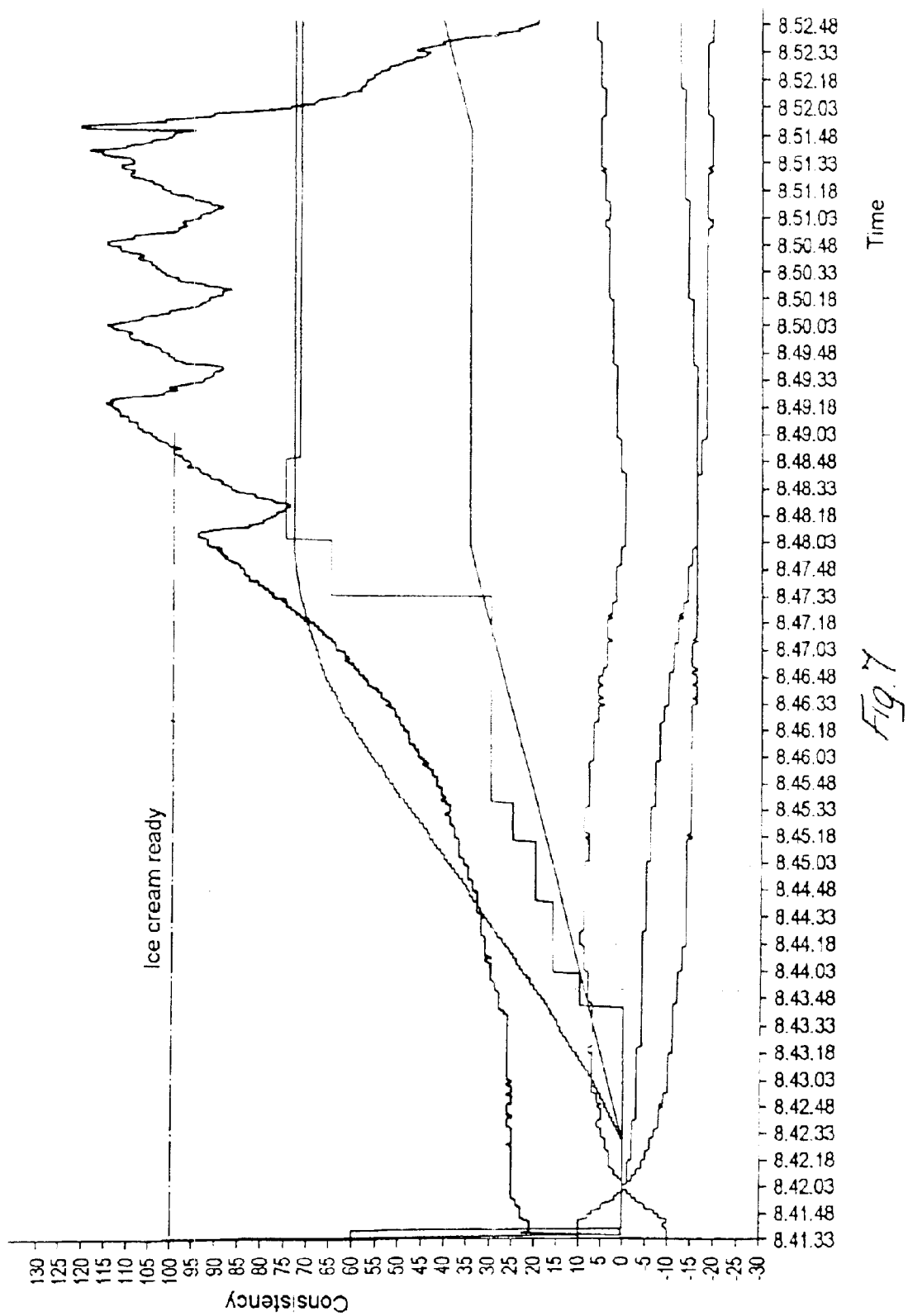
FIGS. 7 to 10 show a corresponding number of consistency versus time diagrams for mixtures treated in a machine operating using the method according to the invention.
Figure 8:
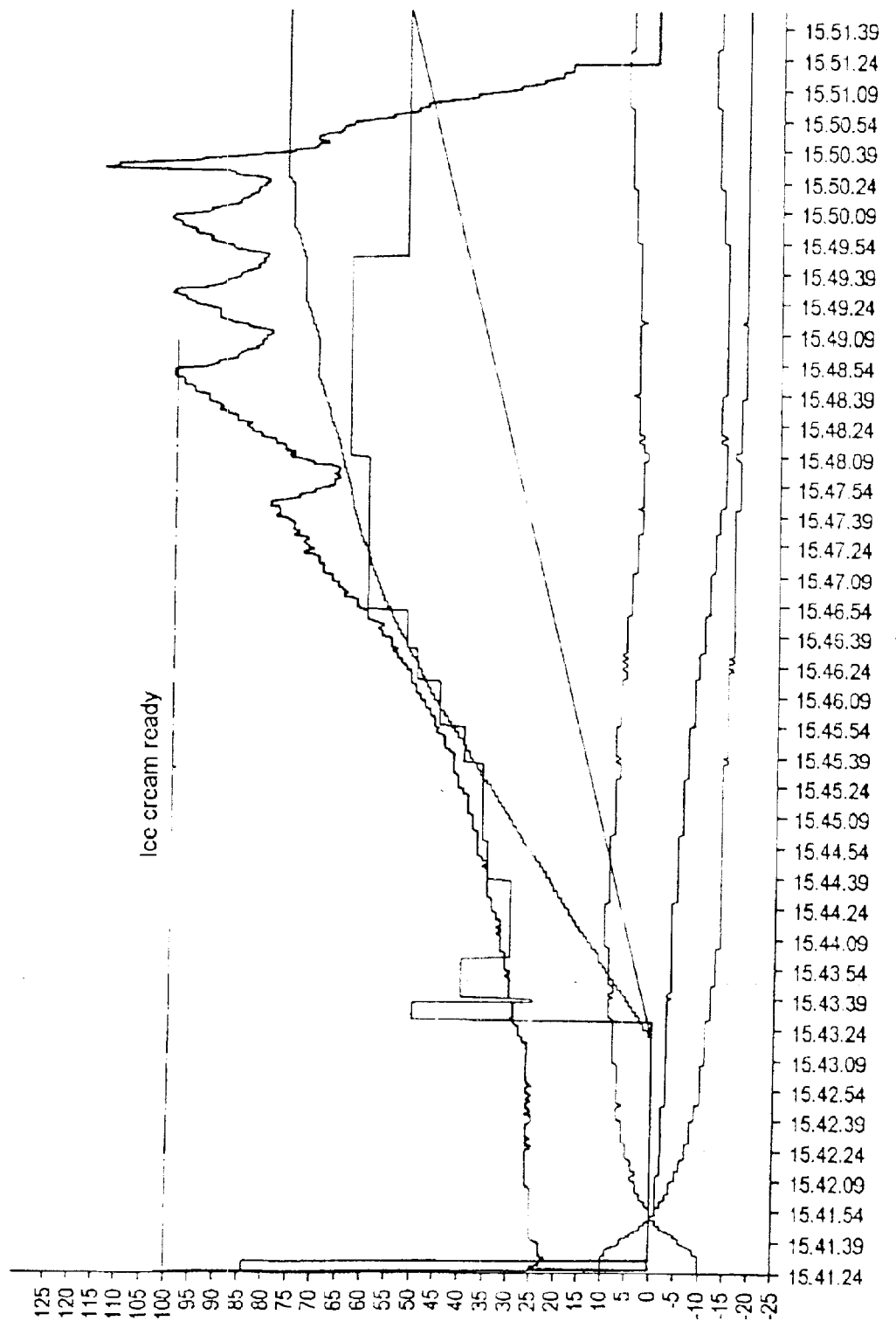

The consistency diagrams in FIGS. 7 and 8 refer to freezing of a same quantity (7 kg) of mixture of the same type, having a different consistency level indicating "ice cream ready" and with the injection of hot gas.

FIG. 7 refers to a machine level 12 for the "ice cream ready" condition (100 on the scale in the diagram).

FIG. 8 refers, in a similar manner, to the nominal predefined machine level 10 (100 on the scale in the diagram).

It should be noted that, when using hot gas, the increase in the consistency is very uniform, so much so that at the end of the process the increase is so fast that the consistency levels set (10 and 12) are reached in very similar times, equal to about 7 minutes, despite a certain delay due to momentary drops in the consistency which can be attributed to the limited amount of product being processed.

Figure 9:
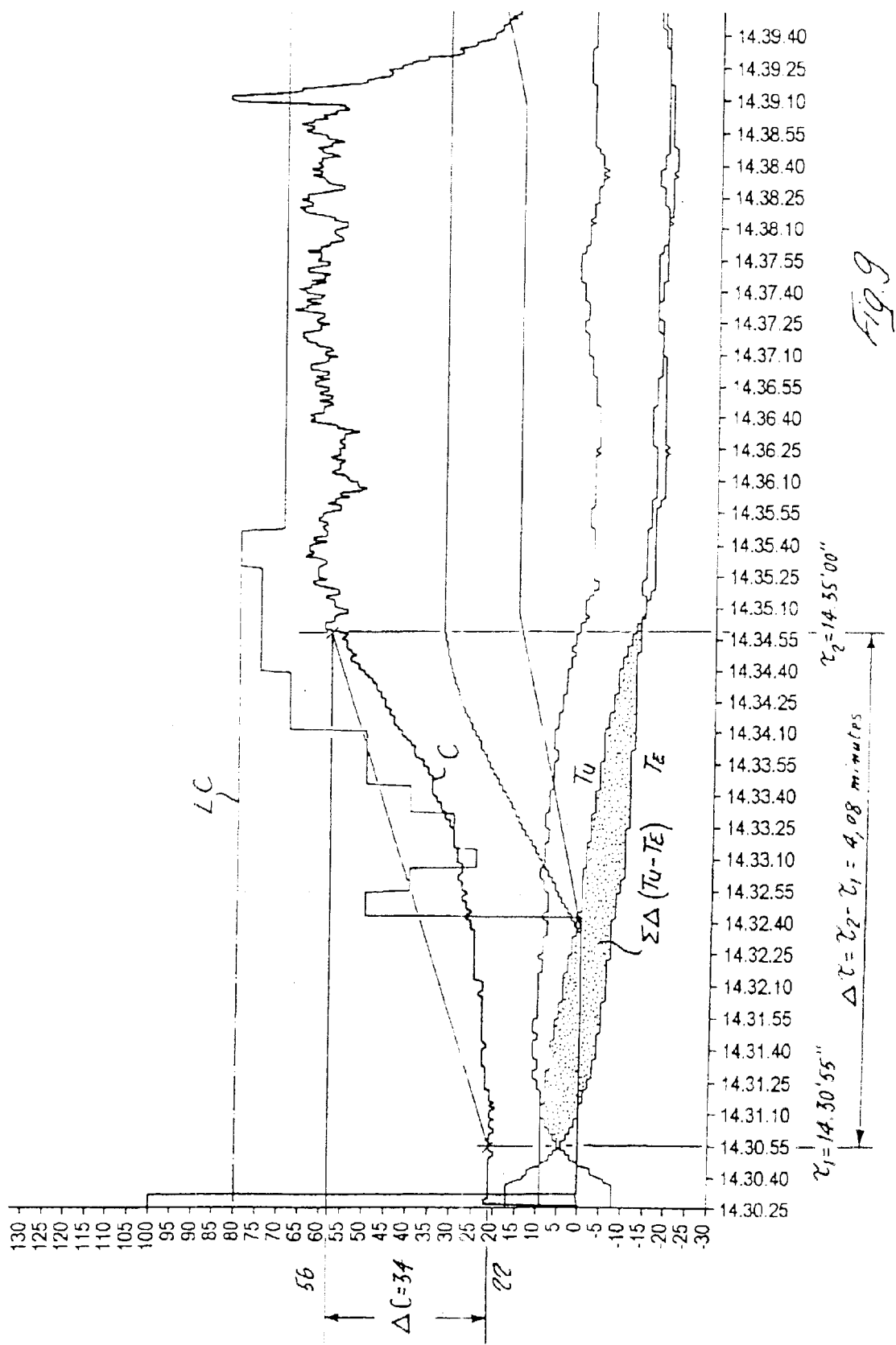
Figure 10:
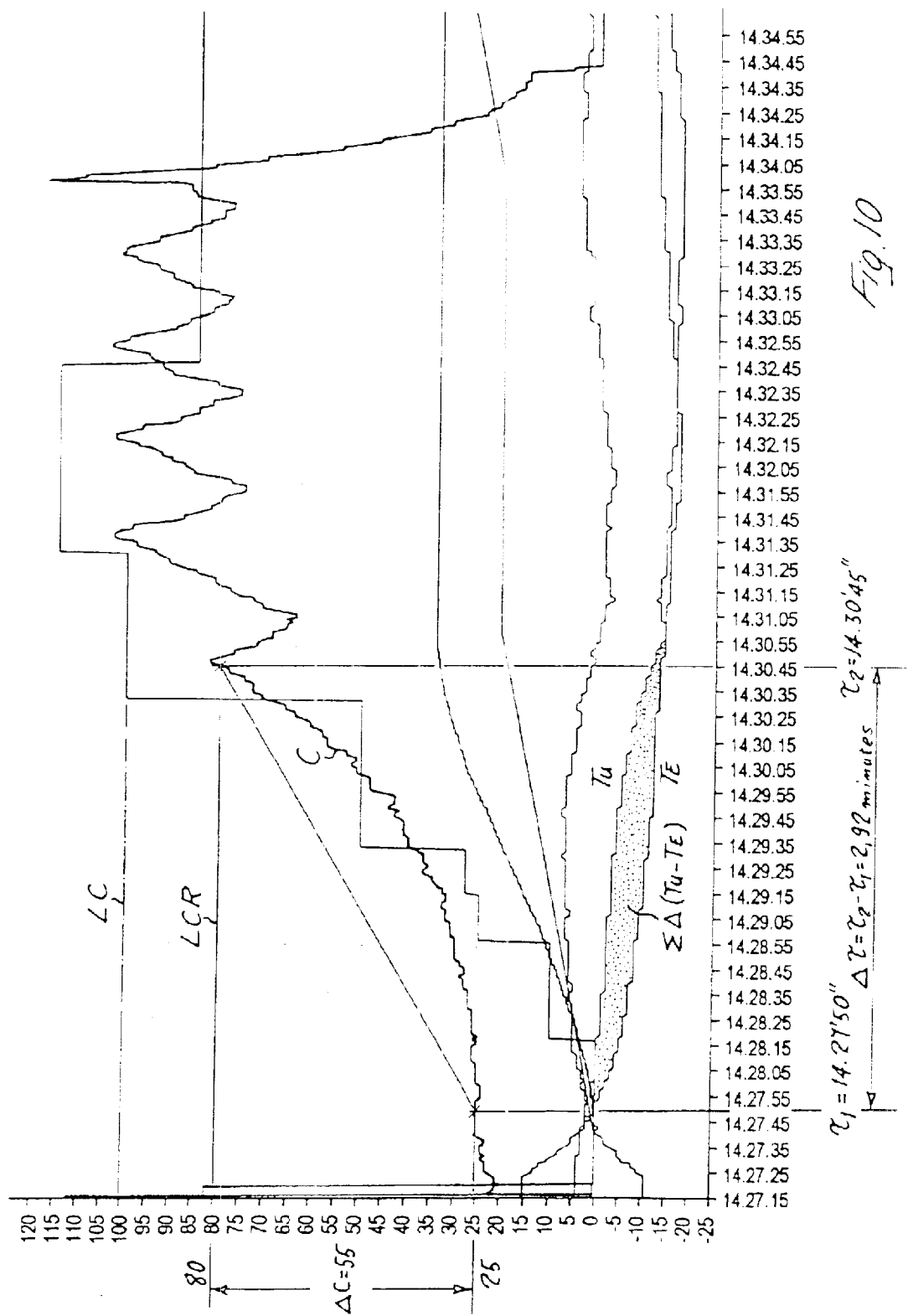

The diagrams in FIGS. 9 and 10 show as a continuous line marked "C" the extremely uniform progression with which the consistency of the product increases.

In FIG. 9, which relates to a mixture practically free of fatty substances and of the watery fruit-based type, and FIG. 10, which relates to a creamy mixture with a fat content of about 10%, it is possible to determine the type of mixture being frozen: namely "watery" or "creamy".

In particular, in FIG. 9, relating to a machine with Nm=4000, the following values are present:

$\Delta\tau=(\tau_2-\tau_1)$=4.06 minutes=mean time in which the evaporator exchanges a large thermal load;

Frequency of the readings performed during the time period $\Delta\tau$: 4"

Number of readings performed: 4.08×60/4=61

$\Delta(T_U-T_E)_{MEAN}$=7.8

$\tau_2$=14.35'00" $\tau_1$=14.30'00"

LC=consistency level for ice cream ready (80)

Area between the temperature curves for refrigerant at the inlet ($T_E$) and at the outlet ($T_U$) of the evaporator:

$$\text{Integral} = \sum_{\tau_2}^{\tau_1} \Delta(T_U - T_E) = 476$$

Consistency derivative:

$$\frac{\Delta c}{\Delta \tau} = \frac{\Delta c}{(\tau_2 - \tau_1)} = \frac{56 - 22}{14.35'.00'' - 14.30'.55''} = \frac{34}{4.08} = 8.33$$

Quality number of the product:

$Nq$=476×8.33=3965

Since Nq is less than Nm, the product being processed is a watery mixture.

In FIG. 10, relating to the same machine (Nm=4000) operating at the start of the test with an "ice cream ready consistency level" LCR (80) which was lower, used previously for the test with a watery mixture, then increased to the nominal value LC (100) towards the end of the test, the following values are obtained:

$\Delta\tau=(\tau_2-\tau_1)=2.92$ minutes=mean time in which the evaporator exchanges a large thermal load;

Frequency of the readings performed during the time period $\Delta\tau$: 4"

Number of readings performed: 2.92×60/4=44

$\Delta(T_U-T_E)_{MEAN}=5.2$ $\tau_2=14.30'45"$ $\tau_1=14.27'50"$

Area between the temperature curves for refrigerant at the inlet ($T_E$) and at the outlet ($T_U$) of the evaporator:

$$\text{Integral} = \sum_{\tau_2}^{\tau_1}\Delta(T_U-T_E) = 229$$

Consistency derivative:

$$\frac{\Delta c}{\Delta\tau} = \frac{\Delta c}{(\tau_2-\tau_1)} = \frac{80-25}{14.30'.45"-14.27'.50"} = \frac{55}{2.92} = 18.33$$

Quality number of the product:

$$Nq=229\times18.83=4312$$

Since Nq is greater than Nm, the product being processed is a creamy mixture.

Figure 11:
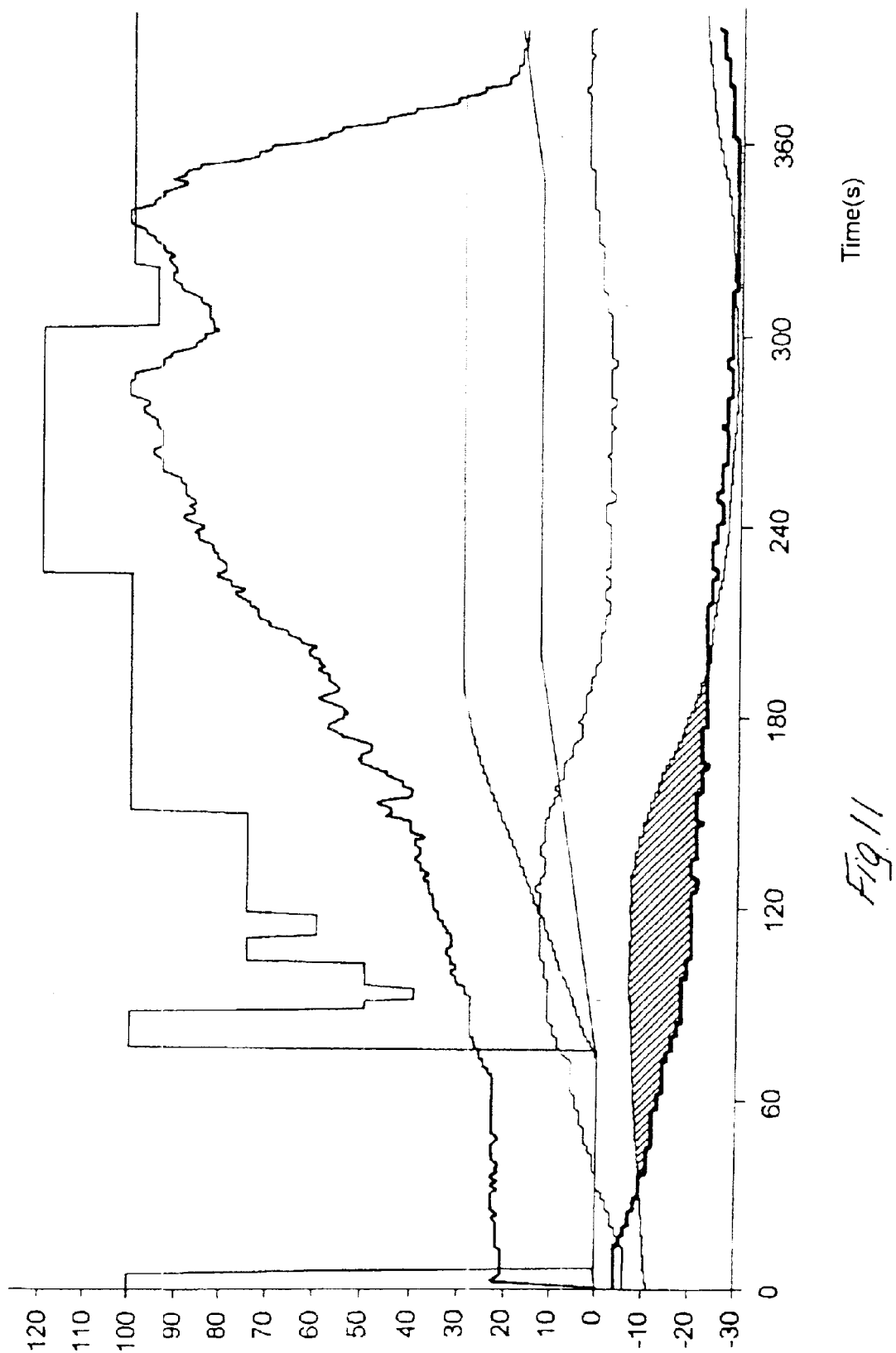
FIGS. 11 and 12 show how with the present method it is possible to determine the quantity of ice-cream mixture contained in the freezing chamber.
Figure 12:
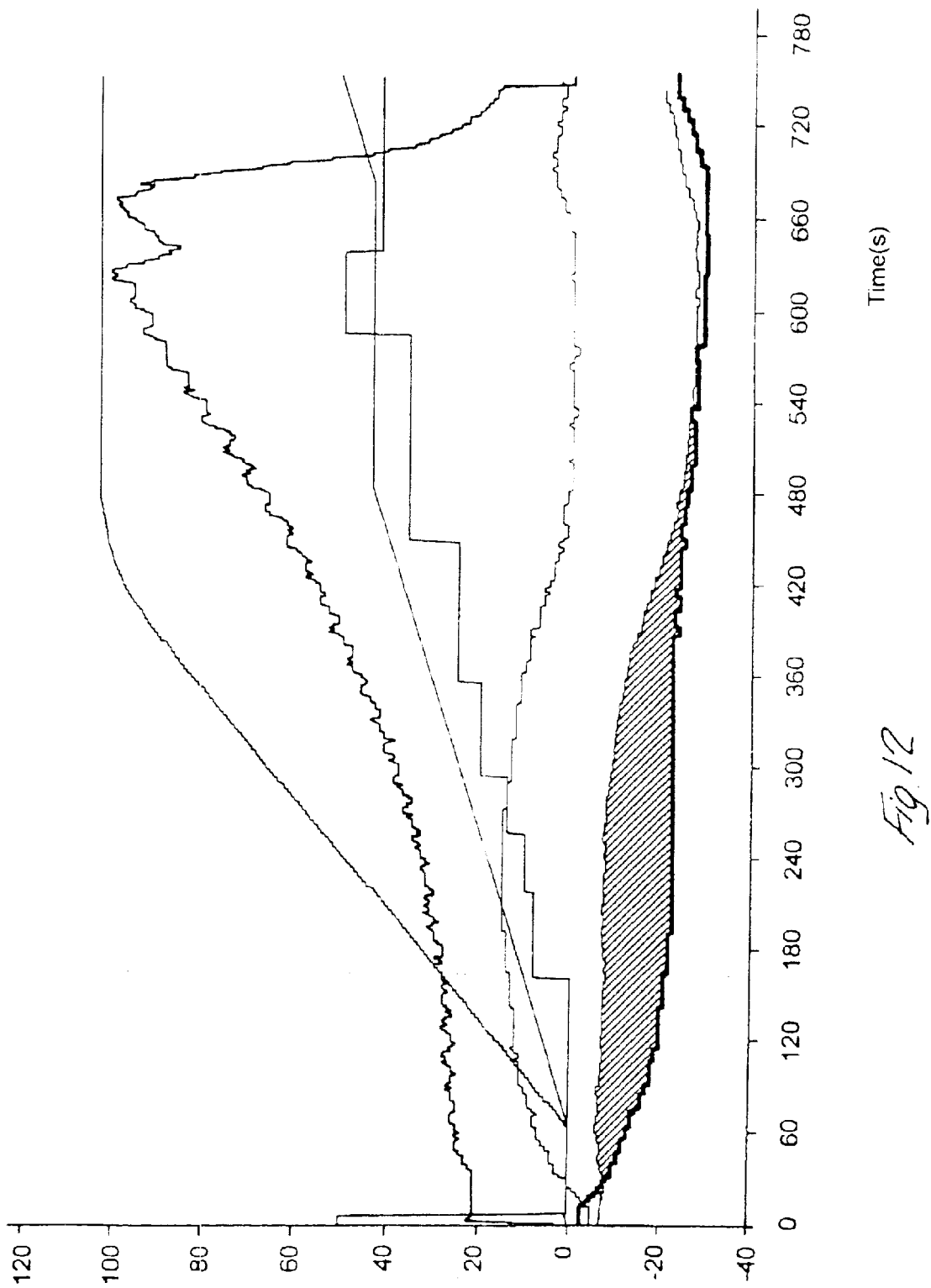

Finally, the diagrams in FIGS. 11 and 12 illustrate determination of the quantity of product being processed in the machine cylinder.

These diagrams 11 and 12 illustrate the stage of freezing in the same machine two different quantities, 3.0 and 10.5 kg respectively, of a same mixture (STELLA) treated in the same manner before introduction into the cylinder of the machine.

The shaded areas represent the sequence, over time, of the differences between the temperatures of the refrigerant at the inlet and at the outlet of the evaporator. The differences mentioned are:

basically the overheating value defined, at each instant, for the thermostatic expansion valve and, since the overheating value defined generates the force for opening of the valve, the temperature differences recorded may be regarded with a good degree of accuracy as being proportional to the flowrate, again at each instant, of refrigerant which the valve introduces into the evaporator.

Consequently, the shaded areas account for the quantity of refrigerant introduced overall into the evaporator.

Since the quantity of refrigerant is a function of the load to be removed, i.e. the quantity of product which is being treated, the shaded areas, if compared, provide a fairly precise indication as to the quantity of product being processed.

An examination of the areas in question shows in fact that the area in FIG. 11, relating to the freezing of a quantity of product equal to about 3.0 kg is about $\frac{1}{3}^{rd}$ of the area shown in FIG. 12 relating to the freezing of a quantity of product 3 times greater (10.5 kg).

The advantages arising from the method according to the invention are obvious. In addition to the advantages mentioned during the course of the description, it is also pointed out that, as a result of this method, excessively low temperatures of the product are avoided—which temperatures would cause the product to adhere to the various parts of the stirrer—thereby making extraction of the product from the freezing cylinder simple and safe.

Moreover, with the present method the product is always kept at temperatures which are not excessively low and in a plastic state which helps maintain the shape which may be given to the ice cream after extraction from the freezing cylinder.

Owing to the fact that the mass of ice cream is kept in a highly plastic state, the formation of cold lumps within it is prevented and moreover, owing to the action of the stirrer which breaks up the local agglomerations, adhesion of the air to the fatty fractions is promoted, improving the increase in volume of the product.

Moreover, the system described facilitates the movements of the product inside the freezing cylinder, providing the machine with optimum characteristics as regards regulation of the production, which may be varied as required, while maintaining the same operating characteristics (ideal transmission of the heat and product extraction efficiency) both under maximum output conditions and minimum output conditions.

What is claimed is:

1. An apparatus for controlling and optimizing the cycle for production of ice cream based on an ice cream mixture used in the apparatus, said apparatus comprising:
   a freezing cylinder exchanging heat with an evaporator of a refrigerating circuit, said evaporator having an inlet, an outlet, and refrigerating gas;
   an electric motor;
   a stirrer/scraper element rotatable inside said freezing cylinder and actuated by the electric motor;
   a processing element adapted for executing a software program;
   sensors for detecting, continuously, temperature values of the refrigerating gas at the inlet and at the outlet of said evaporator; and
   means for detecting, continuously, power values of the electric power used by said electric motor;
   wherein said temperature values and said power values are continuously input into said processing element; and
   said software program processing said temperature values and said power values so as to provide an output signal to drive an impulse solenoid valve for introducing continuously hot gases taken from an exhaust of a compressor into a main stream of refrigerating fluid.

2. The apparatus of claim 1, wherein the introduction of hot gases into the main stream of the refrigerating fluid is regulated by said processing element so as to maximize and keep constant, over time, the transfer of heat from the ice cream mixture contained in the freezing cylinder to the refrigerating fluid in the evaporator without resorting to differences in temperature between the ice cream mixture and the refrigerating fluid which are too low, by means of an increase in the thermal supply factors of the fluids in contact with the wall of the freezing cylinder.

3. The apparatus of claim 1, further comprising a thermostatic valve, in which the injection of hot gas into the refrigerating fluid downstream of said thermostatic valve produces an increase in the speed of the refrigerant with a consequent increase in the removal of heat and therefore with an increase in the overall transfer coefficient of the exchange between the ice cream mixture and the refrigerating fluid.

4. A method for controlling and optimizing the cycle for production of ice cream based on the ice cream mixture, said method comprising:

supplying a freezing cylinder exchanging heat with an evaporator of a refrigerating circuit having an inlet, an outlet, and refrigerating gas, and a stirrer/scrapper element rotating inside the freezing cylinder which is actuated by an electric motor;

detecting continuously temperature values of the refrigerating gas at the inlet and at the outlet of the evaporator;

detecting continuously power values of the electric power used by the electric motor; and processing the temperature values and the power values to produce an output signal which drives an impulse solenoid which in turn introduces hot gases taken from an exhaust of a compressor into a main stream of a refrigerating fluid of the evaporator.

5. The method of claim 4 wherein said processing of the temperature values and the power values results in the introduction of hot gases into the main stream of the refrigerating fluid so as to maximize and keep constant, over time, the transfer of heat from the ice cream mixture contained in the freezing cylinder to the refrigerating fluid in the evaporator without resorting to differences in temperature between the ice cream mixture and the refrigerating fluid which are too low, by means of an increase in the thermal supply factors of the fluids in contact with the wall of the freezing cylinder.

6. The method of claim 4, wherein said refrigerating circuit comprises a thermostatic valve, in which the injection of hot gas into the refrigerating fluid downstream of the thermostatic valve produces an increase in the speed of the refrigerant with a consequent increase in the removal of heat and therefore with an increase in the overall transfer coefficient of the exchange between the ice cream mixture and the refrigerating fluid.

* * * * *